Nov. 7, 1950                E. VASSY             2,528,923
MEANS FOR FACILITATING THE FOCUSING OF CERTAIN
DEVICES COMPRISING A PROJECTION SYSTEM, SUCH
AS MICROPHOTOMETERS
Filed Feb. 4, 1948                        2 Sheets-Sheet 1
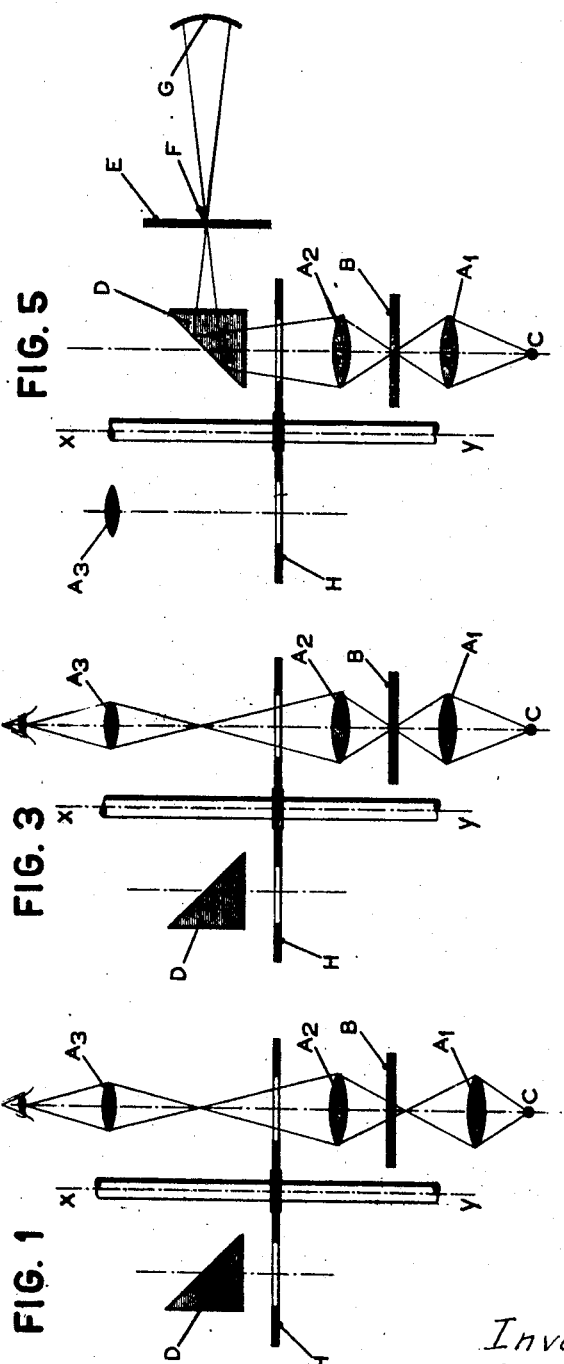
Inventor
E. Vassy
By C. F. Wenderoth
Attorney Patented Nov. 7, 1950

2,528,923

UNITED STATES PATENT OFFICE 2,528,923

MEANS FOR FACILITATING THE FOCUSING OF CERTAIN DEVICES COMPRISING A PROJECTION SYSTEM, SUCH AS MICROPHOTOMETERS

Etienne Vassy, Paris, France

Application February 4, 1948, Serial No. 6,313
In France June 8, 1944

Section 1, Public Law 690, August 8, 1946
Patent expires June 8, 1964

3 Claims. (Cl. 88—24)

Certain projection devices such as those embodied in microphotometers, in order to isolate a narrow area of a photographic print, include a device comprising a first lens adapted to project upon the emulsion to be scanned the image of a luminous filament (or alternatively the image of an illuminated slot onto which said filament is directed) and a second lens adapted to pick up the image of the emulsion area thus illuminated and project it in magnified form onto a slot behind which is a physical receiving means such as a photoelectric cell.

In such apparatus one can never be sure, when the emulsion is projected onto said slot, whether the filament of the light source which is to illuminate the emulsion is properly focussed upon the latter.

An object of the present invention is to provide a new device whereby the above described drawback is eliminated due to the fact that the filament is first of all brought into focus upon the area to be scanned (such as an emulsion) and thereafter only the image of the filament which has preliminarily been focussed on said area is focussed upon the slot. It is thus insured that the image of said area and the image of the filament are simultaneously projected upon the slot (behind which is located the physical receiver, e. g. a photoelectric cell).

The new device thus facilitates the final focussing operation which is effected exclusively on the filament (or on the image thereof) and not on the image of the area to be scanned which is much less bright than the image of the filament.

Another object of the present invention is to provide a device of the type set forth particularly characterised by the new combination of a reflective device with a slot on which the image of the filament and that of the area being scanned are adapted to be focussed.

The attached drawings illustrate diagrammatically and for purposes of exemplification and not of limitation, firstly the basic means forming the subject matter of the invention as applied to a microphotometer, and secondly a further exemplary use of the new method.

Figs. 1 to 6 illustrate the invention as used in connection with a microphotometer, Figs. 1, 3, and 5 showing three different positions of the device embodying the method of the invention, while Figs. 2, 4 and 6 illustrate the results obtained thereby.

Figure 7:
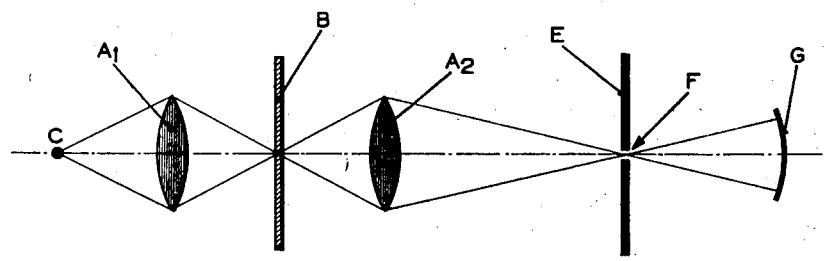

Fig. 7 diagrammatically illustrates a conventional sound pick-up device for sound-track recording.

Figure 8:
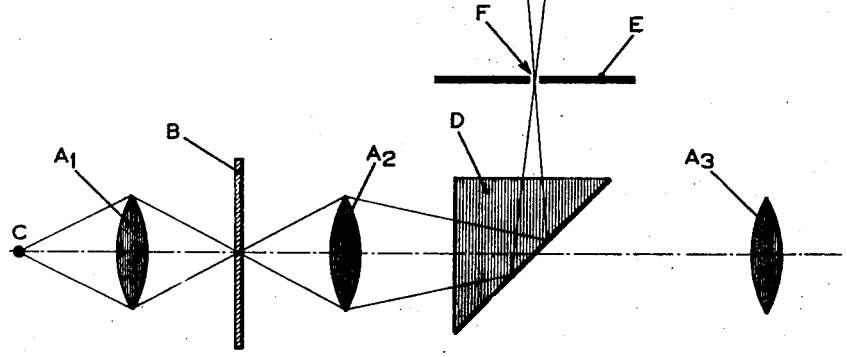

Fig. 8 diagrammatically illustrates the use of the invention in connection with the pick-up means of Fig. 7. Referring to Figs. 1, 3 and 5, A1 designates a lens adapted to project upon the emulsion B the granular structure of which it is desired to analyse, the image of the filament of the light source C, the image of said filament being then picked up by a lens A2 adapted to project it upon the slot F of a screen E behind which is arranged the photoelectric cell G.

According to the invention, the above described assembly is combined with a reflective device such as a reflection prism D arranged on a revolving supporting structure H the axis of rotation of which is indicated at $xy$, and whereby it is possible to substitute for the prism D a microscope eyepiece A3 so arranged as to be adapted (when brought to the position shown in Figs. 1 and 3) to constitute together with the lens A2 a suitably magnifying microscope.

The operation of the device is as follows:

First the eyepiece A3 (Fig. 1) is substituted for the reflective device (the prism D). At this time the observer will see through the microscope formed by the assembly A2—A3 suitably operated by hand, the grain structure of the emulsion as diagrammatically shown in Fig. 2.

Then the lens A1 is operated (Fig. 3) to accurately focus the image of the filament on the emulsion. As soon as such focus is completed the operator will, through the microscope A2—A3 see the filament in focus on the emulsion (Fig. 4). (In order to avoid dazzling, it is possible to arrange in the mounting of the eyepiece, a pivotally mounted absorbing system such as an element of a polarizing device for instance).

The revolving support H is then rotated about the axis $xy$ so as to substitute for the eye-piece A3 the prism D, and it then only remains to complete the focussing on the slot F by operating either the lens A2 or the screen E provided with the slot F, the filament, as a result of the previous adjustment (obtained through the use of the invention) being perfectly focalized with the emulsion on the slot F, whereby there is no danger of losing any luminous energy. The focussing operation is greatly facilitated since it is effected exclusively on the filament or on the image thereof rather than on the image of the emulsion which is much less bright than is the image of the filament.

Fig. 7 diagrammatically illustrates a pick-up device for a sound film sound-track. This pick-up comprises, arranged behind a light source C, a lens A1 which projects the image of the source C upon the emulsion B of the film. A lens A2 projects the magnified image of the illuminated area of the emulsion upon the slot F of a screen E, the photo-cell G being arranged behind the slot F.

According to this invention between the lens A2 and the screen E formed with the slot F there is inserted (see Fig. 8) a reflective device such as a retractibly arranged reflection prism D the optical axis thereafter extending perpendicularly with respect to the initial axis. The retractible prism D is so arranged as to uncover an eyepiece A3 which allows a focussing operation to be effected in the above indicated manner.

It is obvious that the exemplary embodiments of the device as described above and as illustrated in the attached drawings are given merely by way of indication and not of limitation and that said device can be altered in any of its details without departing from the spirit of the invention which further is applicable to apparatus other than microphotometers, photo-electric cell pick-up devices and the like.

What I claim is:

1. In an optical apparatus of the type described including a light source, a translucent area illuminated by said light source through a first lens arrangement and an optical plane on which the image of said translucent area is to be focused, a focusing arrangement comprising in combination a movable support, a second lens arrangement fixed on said support, a reflective means also fixed on said support, and means for selectively shifting said support in such a manner that in a given position thereof the optical axis of said second lens arrangement coincides with the optical axis of said first lens arrangement, and in another predetermined position thereof said reflective means projects the image of said illuminated area onto said optical plane.

2. A focusing arrangement as in claim 1, wherein said reflective means is a reflection prism.

3. In an optical apparatus of the type described including a light source, a translucent area illuminated by said light source through a first lens arrangement, and an optical plane on which the image of said translucent area is to be focused, a focusing arrangement comprising in combination a rotatable support to be rotated about an axis parallel to the optical axis of said first lens arrangement, a second lens arrangement eccentrically fixed on said support having an optical axis parallel to said support rotation axis and spaced apart from said support axis a distance equal to the spacing between said support axis and said first lens arrangement optical axis, and a reflective means also mounted on said support at another similarly eccentric position and adapted to project an image of said translucent area onto said optical plane when brought in the path of said first mentioned optical axis by rotation of said support.

ETIENNE VASSY.

REFERENCES CITED

The following references are of record in the file of this patent:

UNITED STATES PATENTS

| Number | Name | Date |
| --- | --- | --- |
| 1,812,303 | Owens | June 30, 1931 |
| 1,833,074 | Foster | Nov. 24, 1931 |
| 1,839,217 | Greibach | Jan. 5, 1932 |
| 2,178,244 | Sachtleben | Oct. 31, 1939 |
| 2,183,211 | Banks | Dec. 12, 1939 |
| 2,314,392 | Dimmick | Mar. 23, 1943 |
| 2,346,496 | Lorance | Apr. 11, 1944 |